United States Patent [19]

Morita

[11] Patent Number: 5,358,983

[45] Date of Patent: Oct. 25, 1994

[54] CURABLE SILICONE COMPOSITION

[75] Inventor: Yoshitsugu Morita, Chiba, Japan

[73] Assignee: Dow Corning Toray Silicone Co., Ltd., Tokyo, Japan

[21] Appl. No.: 43,248

[22] Filed: Apr. 6, 1993

[30] Foreign Application Priority Data

May 26, 1992 [JP] Japan .................................. 4-158528

[51] Int. Cl.$^5$ .......................... C08K 5/09; C08L 63/00
[52] U.S. Cl. ...................................... 523/455; 528/17;
528/21; 528/26; 528/28
[58] Field of Search ...................... 528/27, 16, 17, 21,
528/26, 28, 33; 523/455

[56] References Cited

U.S. PATENT DOCUMENTS

| | | | |
|---|---|---|---|
| 3,455,877 | 7/1969 | Plueddemann | 260/46.5 |
| 4,370,358 | 1/1983 | Hayes et al. | 427/54.1 |
| 4,707,531 | 11/1987 | Shirahata | 528/12 |
| 4,880,882 | 11/1989 | Morita | 525/472 |
| 4,946,921 | 8/1990 | Shirahata | 528/39 |
| 5,158,991 | 10/1992 | Riding | 522/170 |

FOREIGN PATENT DOCUMENTS

| | | |
|---|---|---|
| 0541988A1 | 10/1992 | European Pat. Off. . |
| 72054 | 6/1981 | Japan . |
| 179417 | 9/1985 | Japan . |
| 5078450 | 3/1993 | Japan . |

OTHER PUBLICATIONS

Lee & Neville, Handbook of Epoxy Resins (1967) pp. 5-1, 5-5, 5-16, 5-20 through 5-23, 11-1, 11-2, 11-16 and 11-17.

Crivello and Lee, "The Synthesis, Characterization, and Photoinitiated Cationic Polymerization of Silicon--Containing Epoxy Resins" pp. 480-503 (1990).

Polymer Journal: Chujo, Shishino, and Yamashita; "Synthesis and Application of Polymerizable Silicone Oligmers from Water Glass" pp. 495-504 (1984).

Primary Examiner—Melvyn I. Marquis
Assistant Examiner—D. Aylward
Attorney, Agent, or Firm—Sharon K. Severance

[57] ABSTRACT

The present invention pertains to a curable silicone composition comprised of (A) an organopolysiloxane represented by the formula

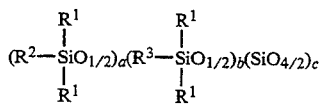

wherein $R^1$ is a monovalent hydrocarbon group other than an alkenyl group; $R^2$ is a monovalent hydrocarbon group other than an alkenyl group or hydrogen; $R^3$ is an organic group that contains an epoxy group or an alkoxysilylalkyl group with the proviso that at least one $R^3$ group is an organic group containing an epoxy group; a is either 0 or a positive number; b is a positive number; c is a positive number; a/c has a value of between 0 to 4, b/c has a value of between 0.05 to 4, and (a+b)/c has a value of between 0.2 to 4; and (B) a curing compound selected from curing agents or curing catalysts. The curable silicone composition of the present invention has superior curing properties and is capable of forming a hardened silicone material with superior flexibility and heat resistance after curing.

17 Claims, No Drawings

CURABLE SILICONE COMPOSITION

BACKGROUND OF THE INVENTION

Because of their superior adhesive properties, bonding properties, environmental resistance, and electrical properties after the silicone is hardened curable silicone compositions are used for electric and electronic fillers, adhesives for electric and electronic applications, coating compositions, and coating materials for rubber. Silicone compositions curable by a condensation-reaction which undergo curing by a dehydration-condenstion reaction of silanol groups, dehydrogenation between a silanol group and a hydrogen bonded to a silicon atom, dealcohol reaction between a silanol group and silicon atom bonded alkoxy group, and silicone compositions curable by an adduct reaction which undergo curing by an adduct reaction between the silicon atom, hydrogen, and fatty acid unsaturated groups in the presence of hydrosilylation reaction catalysts are known in the art.

However, in the silicone compositions curable by a condensation reaction, the curing requires a very long time and the curing property is inferior; in the case of silicone compositions curable by an adduct reaction, curing does not progress in the presence of adduct reaction inhibitors such as sulfur and soldering flux, and the surface of the composition is less likely to be hardened because of oxygen. In addition, in general, the heat resistance of the curable silicone composition is inferior after curing.

For this reason, various types of curable silicone compositions with improved curing properties have been suggested. Curable silicone compositions comprised of a hydrolysate of an organic silane containing an epoxy group and ammonium perchlorate are disclosed in Japanese Kokai Patent Application No. Sho 56[1981]-72054 and curable silicone compositions comprised of an organopolysiloxane containing at least two epoxy groups in a single molecule, organopolysiloxane containing at least two amino groups in a single molecule, and an epoxy curing catalyst are disclosed in Japanese Kokai Patent Application No. Sho 60[1985]-179417.

However, the curing properties of curable silicone compositions suggested in Japanese Kokai Patent Application No. Sho 56[1981]-72054 and Japanese Kokai Patent Application No. Sho 60[1985]-179417 are insufficient, and the flexibility and heat resistance of the cured silicone material are inferior.

It is an object of the present invention is to produce a curable silicone composition with superior curing properties that forms a hard silicone material with superior flexibility and heat resistance after curing.

SUMMARY OF THE INVENTION

The present invention pertains to a curable silicone composition comprised of (A) an organopolysiloxane represented by the formula

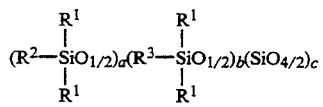

wherein $R^1$ is a monovalent hydrocarbon group other than an alkenyl group; $R^2$ is a monovalent hydrocarbon group other than an alkenyl group or hydrogen; $R^3$ is an organic group that contains an epoxy group or an alkoxysilylalkyl group with the proviso that at least one $R^3$ group is an organic group containing an epoxy group; a is either 0 or a positive number; b is a positive number; c is a positive number; a/c has a value of between 0 to 4, b/c has a value of between 0.05 to 4, and (a+b)/c has a value of between 0.2 to 4; and (B) a curing compound selected from curing agents or curing catalysts.

The curable silicone composition of the instant invention is mainly comprised of an organopolysiloxane made of monofunctional siloxane units (M units) and quaternary functional siloxane units (Q units) and has superior curing properties that forms a hardened silicone material with superior flexibility and heat resistance after curing.

THE INVENTION

The present invention pertains to a curable silicone composition comprised of (A) an organopolysiloxane represented by the formula

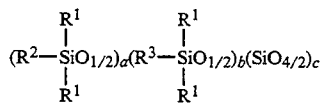

wherein $R^1$ is a monovalent hydrocarbon group other than an alkenyl group; $R^2$ is a monovalent hydrocarbon group other than an alkenyl group or hydrogen; $R^3$ is an organic group that contains an epoxy group or an alkoxysilylalkyl group with the proviso that at least one $R^3$ group is an organic group containing an epoxy group; a is either 0 or a positive number; b is a positive number; c is a positive number; a/c has a value of between 0 to 4, b/c has a value of between 0.05 to 4, and (a+b)/c has a value of between 0.2 to 4; and (B) a curing compound selected from curing agents or curing catalysts.

The organopolysiloxane, component (A), is the primary component of the present invention and is represented by the formula:

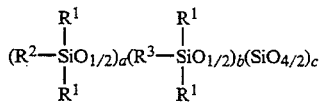

$R^1$ is a monovalent hydrocarbon group other than an alkenyl group. R1 may be exemplified by alkyl groups such as methyl group, ethyl group, propyl group, butyl group, pentyl group; aryl groups such as phenyl group, tolyl group, xylyl group; aralkyl groups such as benzyl group and phenethyl group; and substituted alkyl groups such as chloromethyl group and 3,3,3-trifluoropropyl group. $R^2$ is selected from hydrogen or a monovalent hydrocarbon group other than an alkenyl group. $R^2$ may be exemplified by hydrogen or alkyl groups such as methyl group, ethyl group, propyl group, butyl group, and pentyl group; aryl groups such as phenyl group, tolyl group, xylyl group; aralkyl groups such as benzyl group and phenethyl group; and substituted alkyl groups such as chloromethyl group and 3,3,3-trifluoropropyl group. $R^3$ is an organic group that contains an epoxy group or alkoxysilylalkyl group with the proviso that at least one of $R^3$ is an organic group containing an epoxy group. $R^3$ may be exemplified by organic groups containing an epoxy group, such as glycidoxyethyl group, glycidoxypropyl group, glycidoxybutyl group, 3,4-epoxycyclohexylethyl group, 3,4- epoxycyclohexylpropyl group, 3,4-epoxynorbornaylethyl group, 2- (3,4-epoxy-3-methylcyclohexyl)-2-methylethyl group; and alkoxysilylalkyl groups that provide an adhesive property to the composition of the present invention, such as trimethoxysilylethyl group, triethoxysilylpropyl group, trimethoxysilylbutyl group, triethoxysilylethyl group, triethoxysilylpropyl group, tripropoxysilylethylene, methyldimethoxysilylethyl group, and methyldimethoxysilylpropyl group.

Furthermore a is either 0 or a positive number that indicates the number of monofunctional siloxane units (M units) that do not include an organic group containing an epoxy group or alkoxysilylalkyl group. b is a positive number that indicates the number of monofunctional siloxane units (M units) having an organic group containing an epoxy group or an alkoxysilylalkyl group. c is a positive number that indicates the number of quaternary functional siloxane units (Q units). For each of the ratios, a/c is a number between 0 to 4, b/c is a number between 0.05 to 4, and (a+b)/c is a number between 0.2 to 4. This is because it is not possible to include more than four of the monofunctional siloxane units (M units) per quaternary functional siloxane unit (Q unit), and ill order to produce a hardened silicone material with superior flexibility and heat resistance after curing, at least 0.05 monofunctional siloxane unit (M unit) containing an organic group containing epoxy group or alkoxysilylalkyl group per quaternary functional siloxane unit (Q unit) is necessary.

The organopolysiloxane (A) remains in a liquid state or a solid state at room temperature, and the molecular weight is not especially limited, but from the standpoint of superior curing properties, a range of 500–500,000 is desirale. The organopolysiloxane (A) described above can be produced by, for example, performing an adduct reaction with the organopolysiloxane represented by the formula:

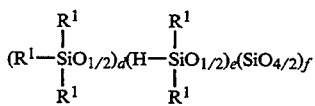

and an unsaturated aliphatic hydrocarbon containing an epoxy group, and an appropriate amount of alkoxysilylalkene in the presence of a hydrosilylation reaction catalyst; wherein $R^1$ is a monovalent hydrocarbon group other than an alkenyl group; d is either 0 or a positive number; e is a positive number; f is a positive number; d/f has a value of between 0 to 4, e/f has a value of between 0.05 to 4, and (d+e)/f has a value of between 0.2 to 4.

The curing compound, component (B), is a component that hardens the organopolysiloxane component (A), and component (B) is not especially limited as long as the material is a curing agent or curing catalyst that is capable of curing the epoxy resin. Useful curing agents may be exemplified by phenolic compounds, carboxylic acid compounds, acid anhydrides, amine compounds, compounds containing alkoxy groups, or mixtures thereof or partial reaction products thereof. Useful curing catalysts may be exemplified by tertiary amine compounds such as imidazole; quaternary amine compounds; phosphorus compounds such as phosphine; aluminum compounds such as organic aluminum; and zirconium compounds such as organic zirconium compounds. Furthermore, in the composition of the present invention, either a curing agent or curing catalyst or a combination of curing a agent and a curing catalyst can be used.

The mixing ratio of component (B) is not especially limited, but it is desirable to add 0.1–500 parts by weight per 100 parts by weight of component (A). This is because when the mixing ratio of component (B) is less than 0.1 part by weight per 100 parts by weight of component (A), the curing reaction is less likely to be initiated, and when the amount exceeds 500 parts by weight, a sufficient degree of the curing reaction fails to occur.

In addition, the curable silicone composition of the present invention mainly composed of component (A) and component (B) may include fillers such as aerosol silica, crystalline silica, fused silica, wet silica, titanium oxide, zinc carbonate, calcium carbonate, iron oxide, and carbon black, fatty acid esters such as stearic acid ester, and palmitic acid ester, metal salts, ester-based waxes, and plasticizers.

The curable silicone compositions of the present invention has superior curing properties and forms a hard silicone material with a superior flexibility and heat resistance after curing; therefore, it can be used effectively for coating compositions, coating agents for electric and electronic parts, adhesives, sealers for electric and electronic parts, sealing agents used for high temperature areas such as automobile engines and furthermore for a composition that provides flexibility in the curable resin compositions.

So that those skilled in the art can understand and appreciate the invention taught herein, the following examples are presented, being it understood that these examples should not be used to limit the scope of this invention found in the claims attached hereto.

In the following examples the value of the viscosity in application examples is the value measured at 25° C., and curable silicone compositions were cured by heating at 150° C. for 3 hours. Furthermore, measurement of physical properties of the hardened silicone material was carried out as described below.

Heat resistance: A small piece of hardened silicone was heated in air at a rate of temperature increase of 10° C./min by thermogravimetric analysis (TGA), and is shown as the residual (wt %) at 850° C.

Flexibility: Both ends of a hardened silicone material molded to form a ¼ inch × ½ inch × 4 inch bar were fixed, then a 5 kg weight was hung from the center of the hardened silicone material, and the warping at the center area was measured. When the warping was less than 0.5 cm, it is classified as x, when 0.5–1 cm, it is classified as Δ, an when it exceeds 1 cm, it is classified as 0.

Hardness: A hardened silicone material molded to form a disc 2 inches in diameter × 1/10 inch was measured by a Barcol 935 hardness meter.

PREPARATION EXAMPLE 1

An organopolysiloxane shown by the formula

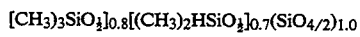

(viscosity 105 centipoise, silicon-bonded hydrogen content 0.40 wt %) was reacted with an excess amount of allyl glycidyl ether in toluene using chloroplatinate as a catalyst. An organopolysiloxane having the formula:

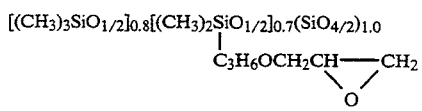  (A)

was produced. The viscosity of the organopolysiloxane produced was 520 centipoise, and the epoxy equivalence was 420.

PREPARATION EXAMPLE 2

An organopolysiloxane shown by the formula:

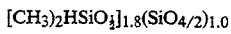

(viscosity 46 centipoise, silicon-bonded hydrogen content 0.92 wt %) was reacted with an excess amount of allyl glycidyl ether in toluene with chloroplatinate as a catalyst. An organopolysiloxane having the formula:

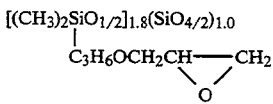  (B)

was produced. The viscosity of the organopolysiloxane produced was 610 centipoise, and the epoxy equivalence was 370.

PREPARATION EXAMPLE 3

A viscous organopolysiloxane shown by the formula

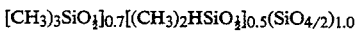

(silicon-bonded hydrogen content 0.33 wt %) was reacted in toluene with an excess amount of allyl glycidyl ether with chloroplatinate as a catalyst. An organopolysiloxane having the formula:

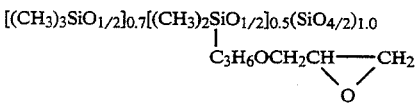  (C)

was produced. The organopolysiloxane produced had a semi transparent brown color, and the epoxy equivalence was 1100.

PREPARATION EXAMPLE 4

An organopolysiloxane shown by the formula

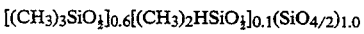

(silicon-bonded hydrogen content 0.09 wt %) was reacted in toluene with an excess amount of allyl glycidyl ether with chloroplatinate as a catalyst. An organopolysiloxane having the formula

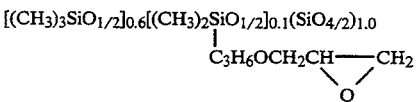  (D)

was produced. The organopolysiloxane produced had a semitransparent brown color, and the epoxy equivalence was 1290.

PREPARATION EXAMPLE 5

An organopolysiloxane shown by the formula

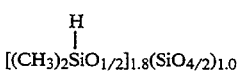

(viscosity 46 centipoise, silicon-bonded hydrogen content 0.92 wt %) was reacted in toluene with an excess amount of 1,2-epoxy-4-vinylcyclosiloxane with chloroplatinate as a catalyst. An organopolysiloxane having the formula

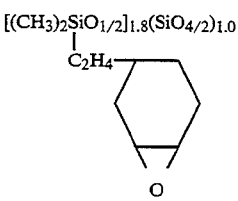  (E)

was produced. The organopolysiloxane produced had a semitransparent brown color, the viscosity was 520 centipoise, and the epoxy equivalence was 230.

PREPARATION EXAMPLE 6

An organopolysiloxane shown by the formula

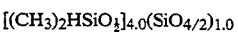

(boiling point 190° C., silicon-bonded hydrogen content 1.22 wt %) was reacted in toluene with an excess amount of allyl glycidyl ether with chloroplatinate as a catalyst, and organopolysiloxane having the formula:

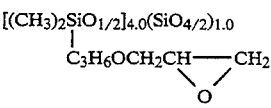  (F)

below was produced. The organopolysiloxane produced was a semitransparent brown color, the viscosity was 54 centipoise, and the epoxy equivalence was 205.

PREPARATION EXAMPLE 7

An organopolysiloxane shown by the formula

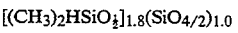

(viscosity 46 centipoise, silicon-bonded hydrogen content 0.92 wt %) was reacted in toluene with a mixture composed of allyl glycidyl ether and allyltrimethoxysilane=1:1 with chloroplatinate as a catalyst. An organopolysiloxane having the formula

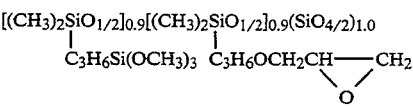  (G)

was produced. The organopolysiloxane produced had a semitransparent yellow color, and the viscosity was 200 centipoise.

EXAMPLE 1

Organopolysiloxanes produced in the Preparation examples, 3,4-epoxycyclohexylmethyl-3,4-epoxycyclohexane carboxylate, 3- or 4-methylhexahydrophthalic anhydride, and 2,4,6-(trisdimethyl- aminomethyl)phenol were uniformly mixed in the weight ratio listed in Table I, and curable silicone compositions were produced. These curable silicone compositions were cured, and the properties of the hardened silicone materials were evaluated. These results are shown in Table I.

Also, the hardness of the curable silicone composition mixed with the organopolysiloxane prepared in Preparation Example 2 after curing was 55.

COMPARATIVE EXAMPLE 1

The organopolysiloxane was omitted, and a curable epoxy resin composition was prepared in the weight ratio shown in Table I. The curable epoxy resin composition was cured as in Example 1, and physical properties of the hardened material were evaluated. Results are shown in Table I.

Also, the hardness of the hardened material was 55, and it was confirmed that no differences existed in the degree of hardness from the hardened material measured in Example 1.

TABLE I

| Type of | Example 1 | | | | | | Comparative |
|---|---|---|---|---|---|---|---|
| organopolysiloxane | A | B | C/F | D/G | E | E | Example 1 |
| Organopolysiloxane | 100 | 100 | 95/5 | 95/5 | 100 | 50 | — |
| A* | — | — | — | — | — | 50 | 100 |
| B* | 37.6 | 42.7 | 14.4 | 12.2 | 40.5 | 76.6 | 120.5 |
| C* | 1 | 1 | 1 | 1 | 1 | 1 | 1 |
| Flexibility | ○ | ○ | ○ | △ | △ | △ | X |
| Residual (wt %) | 33 | 25 | 55 | 63 | 27 | 11 | 0 |

*A: 3,4-Epoxycyclohexylmethyl-3,4-epoxycyclohexanecarboxylate
*B: 3-or 4-(Methylhexahydrophthalic anhydride
*C: 2,4,6-(Trisdimethylaminomethyl)phenol

EXAMPLE 2

In addition to the components of Example 1, a fused silica with an average grain diameter of 13 μm was added, and a curable silicone composition was produced as in Example 1. The curable silicone composition produced was cured as in Example 1, and the physical properties of the hardened silicone material were measured. Results are shown in Table II.

TABLE II

| Type of | Example 2 | |
|---|---|---|
| organopolysiloxane | E | E |
| Organopolysiloxane | 100 | 50 |
| A* | — | 50 |
| B* | 40.5 | 76.6 |
| Fused silica | 137.5 | 169.9 |
| C* | 1 | 1 |
| Flexibility | △ | △ |
| Residual (wt %) | 65 | 57 |

*A: 3,4-Epoxycyclohexylmethyl-3,4-epoxycyclohexane carboxylate
*B: 3-or 4-(Methylhexahydrophthalic anhydride
*C: 2,4,6-(Trisdimethylaminomethyl)phenol

COMPARATIVE EXAMPLE 2

The same components as used in Example 1 were used except the organopolysiloxane shown in the following formula was used, and a curable silicone composition was produced as before. The organopolysiloxane shown in the formula below separated out onto the surface during curing of said curable silicone composition, and it was not possible to evaluate the physical properties of the material.

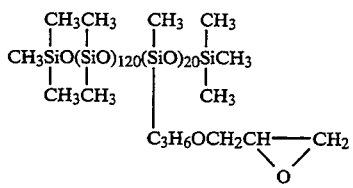

The curable silicone composition of the present invention is composed of component (A) and component (B). Component (A) is an organopolysiloxane composed of monofunctional siloxane units (M units) containing an organic group containing an epoxy group and quaternary functional siloxane units (Q units). The curing properties of the silicone composition are superior, and a hardened silicone material having superior flexibility and heat resistance after curing can be obtained.

What is claimed is:

1. A curable silicone composition consisting essentially of
   (A) an organopolysiloxane represented by the formula

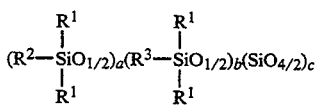

wherein $R^1$ is a monovalent hydrocarbon group except $R^1$ is not an alkenyl group; $R^2$ is hydrogen or a monovalent hydrocarbon group except $R^2$ is not an alkenyl group; $R^3$ is selected from organic groups that contain an epoxy group or an alkoxysilylalkyl group with the proviso that at least one $R^3$ group is an organic group containing an epoxy group; a is a positive number; b is a positive number; c is a positive number; a/c has a value of between 0 to 4, b/c has a value of between 0.05 to 4, and (a+b)/c has a value of between 0.2 to 4; and
   (B) a curing compound selected from curing agents or curing catalysts.

2. A composition as claimed in claim 1 wherein (B) is a curing agent.

3. A composition as claimed in claim 1 wherein (B) is a curing catalyst.

4. A composition as claimed in claim 2 wherein the curing agent is selected from the group consisting of phenolic compounds, carboxylic acid compounds, acid anhydrides, amine compounds, compounds containing alkoxy groups, mixtures thereof and partial reaction products thereof.

5. A composition as claimed in claim 3 wherein the curing catalyst is selected from the group consisting of tertiary amine compounds, quaternary amine compounds, phosphorus compounds, aluminum compounds, and zirconium compounds.

6. A composition as claimed in claim 1 wherein there is 0.1 to 500 parts of (B) per 100 parts of (A).

7. A composition as claimed in claim 1 wherein there is additionally a filler.

8. A composition as claimed in claim 1 wherein there is additionally a ester based wax.

9. A composition as claimed in claim 1 wherein (A) is an organopolysiloxane represented by the formula

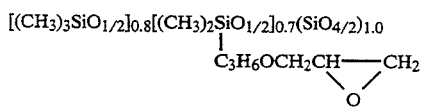

10. A composition as claimed in claim 1 wherein (A) is an organopolysiloxane represented by the formula

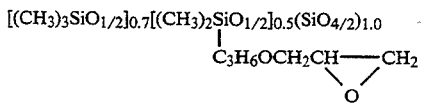

11. A composition as claimed in claim 1 wherein (A) is an organopolysiloxane represented by the formula

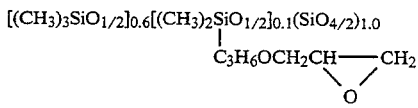

12. A composition as claimed in claim 1 wherein (A) is an organopolysiloxane represented by the formula

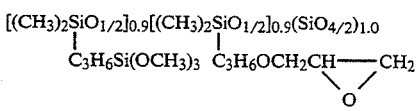

13. A composition produced by curing the composition as claimed in claim 1.

14. A curable silicone composition consisting essentially of
(A) an organopolysiloxane represented by the formula

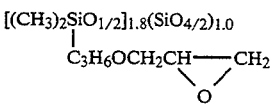

and
(B) a curing compound selected from curing agents or curing catalysts.

15. A composition as claimed in claim 1 wherein $R^1$ is a methyl group.

16. A composition as claimed in claim 1 wherein $R^2$ is a methyl group.

17. A composition as claimed in claim 1 wherein $R^3$ is an epoxy group having the formula

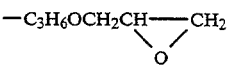

* * * * *